United States Patent
Mei et al.

(10) Patent No.: US 10,573,897 B2
(45) Date of Patent: Feb. 25, 2020

(54) CATALYST LAYER, METHOD FOR PRODUCING THE SAME, MEMBRANE ELECTRODE ASSEMBLY AND ELECTROCHEMICAL CELL

(71) Applicant: KABUSHIKI KAISHA TOSHIBA, Minato-ku (JP)

(72) Inventors: Wu Mei, Yokohama (JP); Shigeru Matake, Yokohama (JP); Taishi Fukazawa, Meguro (JP); Yoshihiro Akasaka, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/850,250

(22) Filed: Sep. 10, 2015

(65) Prior Publication Data
US 2016/0087282 A1    Mar. 24, 2016

(30) Foreign Application Priority Data
Sep. 22, 2014   (JP) .................. 2014-192162

(51) Int. Cl.
| | | |
|---|---|---|
| *H01M 4/86* | (2006.01) | |
| *H01M 8/10* | (2016.01) | |
| *H01M 4/88* | (2006.01) | |
| *H01M 8/1004* | (2016.01) | |

(52) U.S. Cl.
CPC ....... *H01M 4/8621* (2013.01); *H01M 4/8657* (2013.01); *H01M 4/8825* (2013.01); *H01M 8/1004* (2013.01)

(58) Field of Classification Search
CPC combination set(s) only.
See application file for complete search history.

(56) References Cited

U.S. PATENT DOCUMENTS

| | | |
|---|---|---|
| 7,419,741 B2 | 9/2008 | Vernstrom et al. |
| 8,128,986 B2 | 3/2012 | Mei et al. |
| 8,334,233 B2 | 12/2012 | Mei et al. |
| 8,758,959 B2* | 6/2014 | Mei ............. C23C 14/205 429/405 |

(Continued)

FOREIGN PATENT DOCUMENTS

| | | |
|---|---|---|
| CN | 1806356 A | 7/2006 |
| CN | 101310398 A | 11/2008 |

(Continued)

OTHER PUBLICATIONS

Wu Mei et al., "Development of Alternated Catalyst Layer Structure for PEM Fuel Cells", ECS Transactions, vol. 50, (2), 2012, pp. 1377-1384.

*Primary Examiner* — Christopher P Domone
(74) *Attorney, Agent, or Firm* — Oblon, McClelland, Maier & Neustadt, L.L.P.

(57) ABSTRACT

Embodiments of the present disclosure aim to provide a catalyst layer ensuring a high cell voltage and having both excellent robustness and sufficient endurance, and also to provide a process for producing the layer, a membrane electrode assembly and an electrochemical cell. The catalyst layer comprises two or more noble metal-containing layers, and a porous ceramic layer placed between the noble metal-containing layers. Further, in the catalyst layer, voids exist between the porous ceramic layer and the noble metal-containing layers.

12 Claims, 6 Drawing Sheets

(56) References Cited

U.S. PATENT DOCUMENTS

| | | | |
|---|---|---|---|
| 2003/0096155 A1 | 5/2003 | Hong et al. | |
| 2008/0166620 A1* | 7/2008 | Fuller | H01M 4/8652 429/494 |
| 2008/0286632 A1* | 11/2008 | Odgaard | H01M 4/8642 429/454 |
| 2009/0081528 A1 | 3/2009 | Nakano et al. | |
| 2010/0021787 A1 | 1/2010 | Wu et al. | |
| 2010/0239950 A1 | 9/2010 | Mei et al. | |
| 2012/0251915 A1* | 10/2012 | Mei | H01M 8/1004 429/479 |
| 2013/0078550 A1 | 3/2013 | Mei et al. | |
| 2013/0252132 A1 | 9/2013 | Mei et al. | |

FOREIGN PATENT DOCUMENTS

| | | |
|---|---|---|
| CN | 101496193 A | 7/2009 |
| CN | 101562249 A | 10/2009 |
| CN | 102709574 A | 10/2012 |
| CN | 103501896 A | 1/2014 |
| CN | 103855408 A | 6/2014 |
| JP | 2005-158355 A | 6/2005 |
| JP | 2005-216764 A | 8/2005 |
| JP | 2007-507328 A | 3/2007 |
| JP | 2007-257888 A | 10/2007 |
| JP | 2008-21609 A | 1/2008 |
| JP | 2008-108594 A | 5/2008 |
| JP | 2008-229514 A | 10/2008 |
| JP | 2009-76359 A | 4/2009 |
| JP | 2010-33759 A | 2/2010 |
| JP | 2010-221090 A | 10/2010 |
| JP | 4740179 B2 | 8/2011 |
| JP | 4861445 B2 | 1/2012 |
| JP | 2012-204221 A | 10/2012 |
| JP | 2013-82999 A | 5/2013 |
| JP | 2013-226537 A | 11/2013 |
| JP | 2015-116553 A | 6/2015 |
| WO | WO 2014/128208 A1 | 8/2014 |

* cited by examiner

CATALYST LAYER, METHOD FOR PRODUCING THE SAME, MEMBRANE ELECTRODE ASSEMBLY AND ELECTROCHEMICAL CELL

CROSS-REFERENCE TO RELATED APPLICATIONS

This application is based upon and claims the benefit of priority from the prior Japanese Patent Application No. 2014-192162, filed on Sep. 22, 2014, the entire contents of which are incorporated herein by reference.

FIELD

Embodiments of the present disclosure relate to a catalyst layer, a method for producing the layer, a membrane electrode assembly and an electrochemical cell.

BACKGROUND

In recent years, electrochemical cells have been vigorously studied. Electrochemical cells include, for example, a fuel cell, which comprises a system generating electricity by reacting a fuel such as hydrogen with an oxidizing agent such as oxygen. In practice, polymer electrode fuel cells (hereinafter, often referred to as "PEFCs") are particularly employed as stationary power supplies for home use or power supplies for automobile because they have low impacts on the environment. Although the PEFCs produce water as a reaction product and can work at a low temperature as compared with other fuel cells, they use noble metal catalyst in a large amount and hence are costly. Accordingly, in order to popularize the PEFCs, it is very important to reduce the cost by decreasing the amount of noble metal catalyst.

Electrodes in a PEFC individually comprise a catalyst layer, and the catalyst layer is normally made with carbon-supported catalyst in which catalyst material is loaded on carbon black carrier. However, if the PEFC is employed as, for example, a power supply for automobile, the carbon carrier contained in the cathode-side catalyst layer is gradually corroded and also the noble metal catalyst itself loaded on the carbon carrier is gradually dissolved while the operation is repeatedly started and stopped. This is reported to result in accelerating deterioration of both the catalyst layer and the membrane electrode assembly (hereinafter, often referred to as "MEA") comprising the catalyst layer.

For the purposes of avoiding the problem of corrosion of the carbon carrier and thereby of ensuring sufficient endurance, it is examined to use a catalyst layer formed not by using the carbon carrier but by sputtering or vapor-depositing catalyst onto a support. Examples of that kind of catalyst layer include a catalyst layer formed by sputtering platinum onto a whisker substrate (see, for example, PCT International Application Publication No. 2007-507328). Since containing no carbon carrier, that catalyst layer can have sufficient endurance.

However, if the above catalyst layer is used on the cathode side in a fuel cell to which humid fuel is supplied, the cell often suffers from what is called a "flooding phenomenon", in which water produced by electrode reaction is not drained from the catalyst layer to cause water stagnation. As a result, the cell voltage largely lowers particularly at about room temperature. Further, even if dry fuel is supplied to the cell, the cell voltage may lower considerably. That is presumed to be because the catalyst layer has too small water-holding capacity to provide a sufficient amount of water to the electrolytic membrane. Accordingly, the catalyst layer is required to have not only sufficient endurance but also excellent robustness.

Meanwhile, from the viewpoint of water management, it is proposed in view of the hydrophobicity of carbon to introduce fibrous carbons into between stacked platinum layers (see, for example, JP 2010-33759A). However, that is not enough to obtain excellent robustness. Here, it is noted that there is no problem even if the fibrous carbons are partly corroded because the fibrous carbons do not serve as the catalyst carrier.

DETAILED DESCRIPTION

Embodiments will now be explained with reference to the accompanying drawings.

An embodiment of the present disclosure provides a catalyst layer comprising two or more noble metal-containing layers and a porous ceramic layer placed between said noble metal-containing layers, wherein voids exist between said porous ceramic layer and said noble metal-containing layers.

First Embodiment

Figure 1:
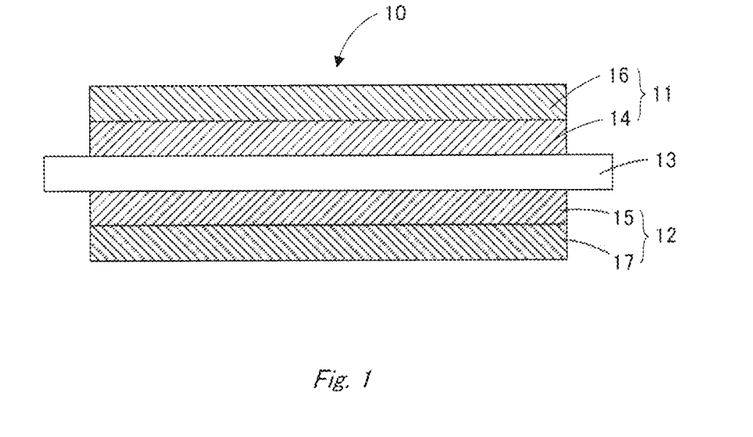
FIG. 1 is a schematic sectional view of a membrane electrode assembly according to the first embodiment.
Figure 2:
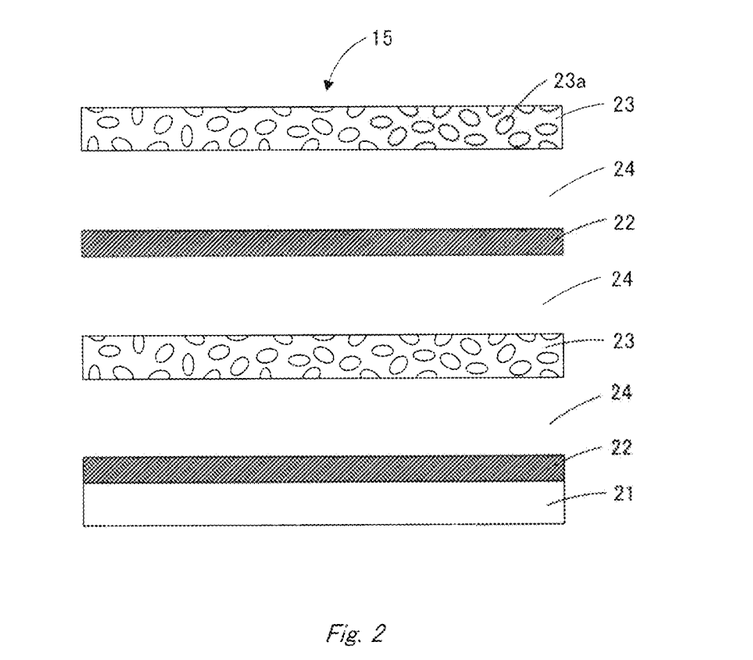
FIG. 2 is a schematic sectional view of a catalyst layer according to the first embodiment.
Figure 3:
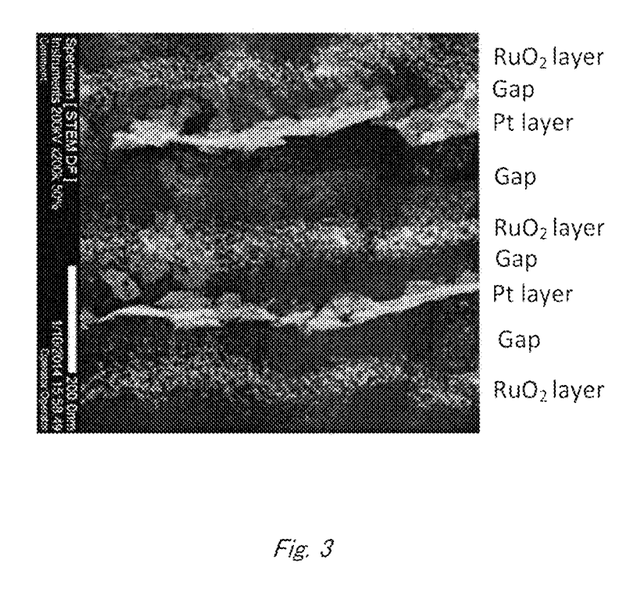
FIG. 3 is a scanning transmission electron microscope image of a catalyst layer according to the first embodiment.
Figure 4A:
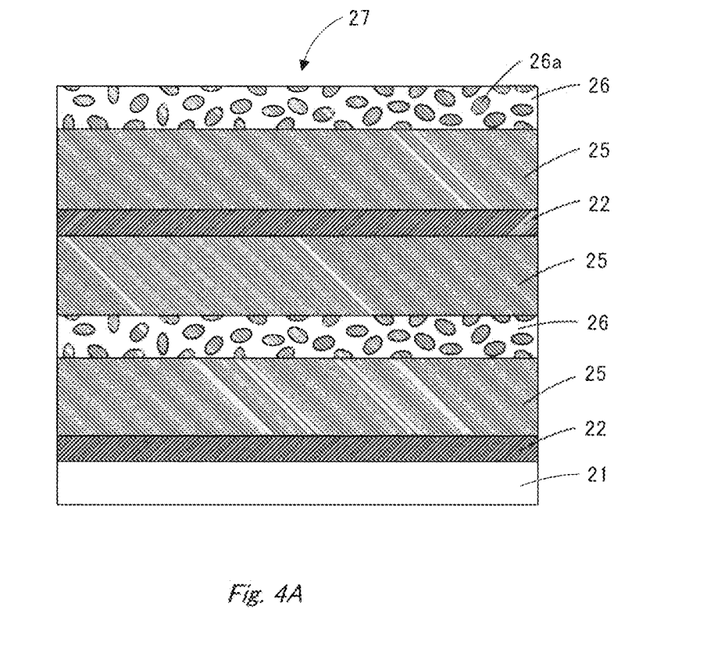
FIGS. 4A and 4B schematically illustrate a process for producing a catalyst layer according to the first embodiment.
Figure 4B:
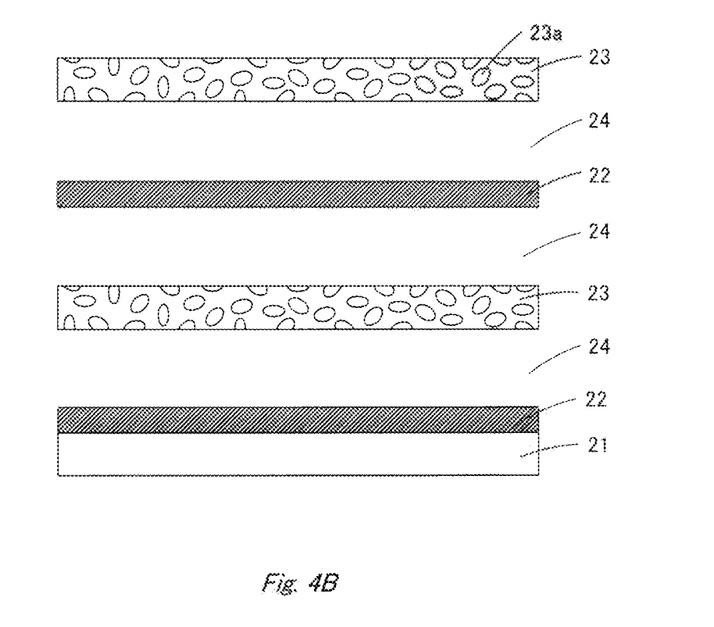
Figure 5:
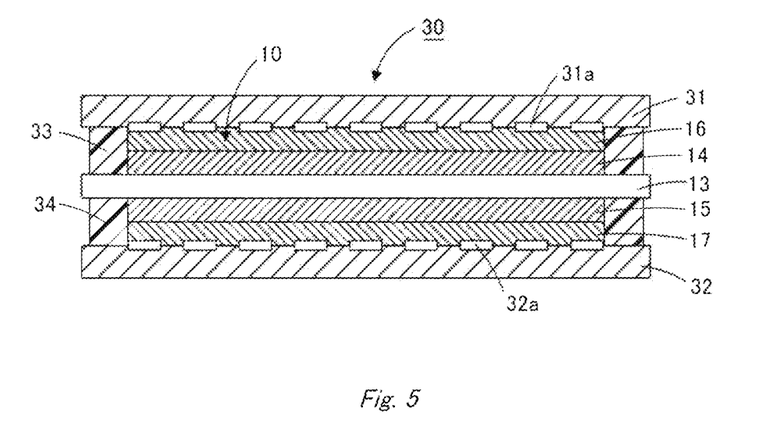
FIG. 5 is a schematic sectional view of an electrochemical cell according to the first embodiment.

According to the first embodiment, a catalyst layer, a process for producing the layer, a membrane electrode assembly and an electrochemical cell are described below with reference to the attached drawings. FIG. 1 is a schematic sectional view of a membrane electrode assembly according to the present embodiment, FIG. 2 is a schematic sectional view of a catalyst layer according to the present embodiment, FIG. 3 is a scanning electron microscope image of a catalyst layer according to the present embodiment, FIG. 4 schematically illustrates a process for producing a catalyst layer according to the present embodiment, and FIG. 5 is a schematic sectional view of an electrochemical cell according to the present embodiment.

<<<Catalyst Layer and Membrane Electrode Assembly>>>

The membrane electrode assembly (MEA) 10 shown in FIG. 1 comprises a pair of electrodes 11, 12 placed apart from and face-to-face with each other, and an electrolyte membrane 13 placed between the electrodes 11, 12.

<<Electrolyte Membrane>>

The electrolyte membrane 13 contains, for example, an electrolyte having proton conductivity. The electrolyte membrane 13 has a function by which hydrogen ions originating from a fuel supplied to the electrode 11 are transferred into the electrode 12. Examples of the electrolyte having proton conductivity include sulfonic acid group-containing fluorocarbon polymers (e.g., Nafion ([trademark], manufactured by DuPont), Flemion ([trademark], manufactured by Asahi Kasei Corporation), and Aciplex ([trademark], manufactured by Asahi Glass Co., Ltd.) and inorganic substances such as tungstic acid and phosphotungstic acid.

The thickness of the electrolyte membrane 13 is properly determined in consideration of characteristics of the MEA 10. From the viewpoints of strength, dissolution resistance and power characteristics of the MEA 10, the electrolyte membrane 13 has a thickness of preferably 5 to 300 μm inclusive, more preferably 5 to 150 μm inclusive.

<<Electrode>>

The electrodes 11, 12 comprise catalyst layers 14, 15, respectively, in contact with the electrolyte membrane 13, and also gas-diffusion layers 16, 17 provided on the catalyst layers 14, 15, respectively. When the MEA 10 is used in a fuel cell, the electrodes 11, 12 serve as the anode and cathode, respectively. The anode and cathode are supplied with hydrogen and oxygen, respectively.

<Gas-Diffusion Layer>

The gas-diffusion layers 16, 17 are made of materials selected freely from substances having sufficient gas-diffusivity and electrical conductivity. Examples of the materials include carbon paper, carbon cloth, metal felt and non-woven cloth. The gas-diffusion layers 16, 17 preferably contain a water-repellent agent, which improves, for example, water repellency of the gas-diffusion layers 16, 17 to prevent the flooding phenomenon. Examples of the water-repellent agent include fluorinated polymer materials, such as, polytetrafluoroethylene (PTFE), polyvinylidene fluoride (PVDF), polyhexafluoropropylene, and tetrafluoroethylene-hexafluoropropylene copolymer (FEP). In a PEFC, the content of the water-repellent agent (i.e., weight percent of the water-repellent agent in the gas-diffusion layers) is preferably 2 to 30 wt % inclusive in general. The characteristics of PEFC can be improved by providing a micro-porous layer between the gas-diffusion layer and the catalyst layer, and the micro-porous layer has a thickness of preferably 1 to 50 μm inclusive, more preferably 2 to 30 μm inclusive. In order to improve the characteristics or robustness of PEFC, it is also possible to adjust the void ratio in the micro-porous layer and the content of water-repellent agent or hydrophilicity (i.e., weight percent of the water-repellent agent or hydrophilic agent in the micro-porous layer). As the hydrophilic agent, any hydrophilic substance can be used. Examples of the hydrophilic agent include hydrophilic group-containing organic or ceramic (e.g., $SiO_2$, $Al_2O_3$, $TiO_2$) substances.

<Catalyst Layer>

The catalyst layers 14, 15 comprise catalyst material, which contains at least one selected from the group consisting of noble metals, such as, Pt, Ru, Os, Ir, Pd and Au. That kind of catalyst material is excellent in catalytic activity, electrical conductivity and stability. Oxides of the above metals are also usable as the catalyst material, and further the catalyst material may be still also a complex oxide or oxide mixture containing two or more of the metals.

What noble metal element is optimal depends on what reaction is carried out. If used in hydrogen oxidation reaction or hydrogen generation reaction, the catalyst layers 14, 15 contain Pt, for example.

If used in oxidation reaction of reformed hydrogen gas containing CO or of alcohols such as methanol and ethanol, the catalyst layers 14, 15 contain an alloy represented by $Pt_yRu_zT_{1-y-z}$, for example. In the formula, y and z are numbers satisfying the conditions of $0.2 \leq y \leq 0.8$ and $0 \leq z \leq 0.8$, respectively, and T represents at least one element selected from the group consisting of W, Hf, Si, Mo, Ta, Ti, Zr, Ni, Co, Nb, V, Sn, Al and Cr. That alloy contains 20 to 80 atm % of Pt, 0 to 80 atm % of Ru and 0 to 80 atm % of T.

If used in oxygen reduction reaction, the catalyst layers 14, 15 contain an alloy represented by $Pt_uM_{1-u}$, for example. In the formula, u is a number satisfying the condition of $0 < u \leq 0.9$ and M represents at least one element selected from the group consisting of Co, Ni, Fe, Mn, Ta, W, Hf, Si, Mo, Ti, Zr, Nb, V, Cr, Al and Sn. That alloy contains Pt in an amount of more than 0 atm % but not more than 90 atm % and M in an amount of not less than 10 atm % but less than 100 atm %.

If used in oxygen generation reaction, the catalyst layers 14, 15 contain an oxide of at least one metal selected from the group consisting of Ir, Ru, Pt, Au, Rh and Os, for example. Otherwise, the catalyst layers 14, 15 contain a complex oxide comprising the above oxide and Ta or Sn oxide. If the catalyst layers 14, 15 contain Pt or Ir in an amount of 30 atm % or more, the catalyst material can ensure both activity and endurance.

At least one of the catalyst layers 14, 15 has a structure shown in FIG. 2. It is preferred for both the catalyst layers 14, 15 to have a structure shown in FIG. 2. In that case, the catalyst materials contained in the catalyst layers 14, 15 may be the same as or different from each other. The aforementioned flooding phenomenon generally occurs on the cathode side in a PEFC, and hence the catalyst layer 15 preferably has a structure shown in FIG. 2 so as to avoid the flooding phenomenon. Accordingly, the following description will be given on the assumption that the catalyst layer 15 has a structure shown in FIG. 2. Here, it is noted that the structure shown in FIG. 2 is a part of the catalyst layer 15.

As shown in FIG. 2, the catalyst layer 15 comprises: a substrate 21; two or more noble metal-containing layers 22 which are stacked on the substrate 21 and placed apart from and face-to-face with each other; and porous ceramic layers 23 which are placed between the noble metal-containing layers 22 and which contain voids 23a. In addition, voids 24 exist between the noble metal-containing layers 22 and the porous ceramic layers 23. The noble metal-containing layers 22 are thus at least partly separated by the voids 24 from the porous ceramic layers 23. FIG. 3 shows a scanning transmission electron microscope (STEM) image of the catalyst layer observed at 200000-fold magnification.

It is enough that the voids 24 at least partly exist between the noble metal-containing layers 22 and the porous ceramic layers 23. In other words, it is enough that the noble metal-containing layers 22 are at least partly not in contact with but separated from the porous ceramic layers 23 by the voids 24. Accordingly, the noble metal-containing layers 22 may be partly in contact with the porous ceramic layers 23.

The noble metal-containing layers 22 and the porous ceramic layers 23 are preferably fused at their edges to connect physically with each other (not shown). If fused at their edges to connect physically with each other, the noble metal-containing layers 22 and the ceramic layers 23 can be kept separate from each other.

In the catalyst layer 15, the maximum distance between adjacent two of the noble metal-containing layers 22 is preferably 10 to 400 nm inclusive. As long as the maximum distance between the adjacent noble metal-containing layers 22 is within the above range, substances can migrate smoothly enough not to cause unfavorable effects on characteristics of the electrochemical cell. The maximum distance between the adjacent noble metal-containing layers 22 is more preferably 15 to 300 nm inclusive.

In view of the power generation environmental robustness and of low temperature startability of the fuel cell, there are cases in which the maximum distance between the adjacent noble metal-containing layers 22 is preferably 30 to 400 nm inclusive. The maximum distance between the adjacent noble metal-containing layers 22 in the catalyst layer 15 can be managed by controlling the amount of the pore-forming material described below, the sputtering conditions and the like.

The maximum distance from the porous ceramic layer 23 to adjacent two of the noble metal-containing layers 22 is preferably 10 to 300 nm inclusive. As long as the maximum distance from the porous ceramic layer 23 to the noble metal-containing layers 22 is within the above range, it is possible both to reduce water stagnation and to supply the fuel.

(Noble Metal-Containing Layer)

The noble metal-containing layer 22 contains a noble metal, and preferably does not contain non-metal carrier.

The noble metal-containing layer 22 preferably contains at least one selected from the group consisting of Pt, Ir, Ru, Au, Pd, Rh and Ag in an amount of 20 atm % or more. In view of the endurance, Pt is a favorable noble metal.

From the viewpoint of reducing the noble metal catalyst, the noble metal-containing layer 22 in a PEFC preferably contains the noble metal in an amount of 0.01 to 0.3 mg/cm$^2$ inclusive.

The noble metal-containing layer 22 can have a multilayer structure, such as, a sandwich structure. For example, the noble metal-containing layer may be composed of a central part made of material other than noble metal and a surface part made only or mainly of noble metal. In that case, the difference in the composition between the central part and the surface part can lead to form such a specific surface atomic state as to realize high catalyst activity. Further, since the noble metal is used only in the surface part, the amount of the noble metal can be reduced. In view of the catalyst activity and endurance, the thicknesses, compositions and structures of the central and surface parts in the noble metal-containing layer can be optimized according to conditions for use. There are also cases in which the surface part contains a base metal, as well as the noble metal, in a little bit more amount than the noble metal so as to form a specific surface composition and structure for improving the catalyst activity and also to reduce the amount of the noble metal.

The noble metal-containing layer 22 may have a porous structure with pores. If the noble metal-containing layer 22 is porous, substance migration such as water drainage proceeds smoothly. As a result, even if the noble metal is used in a small amount, it is possible to improve characteristics of the electrochemical cell. The noble metal-containing layer 22 preferably has a void ratio of 20 to 80 vol % inclusive. The void ratio in the noble metal-containing layer is determined in the following manner. First, the cross-section is observed by SEM to obtain a void area ($S_{N1}$) and a noble metal area ($S_{N2}$) in the noble metal-containing layer. Then, the void area ($S_{N1}$) is divided by the total area ($S_{N1}+S_{N2}$) to obtain the area ratio ($S_{N1}/(S_{N1}+S_{N2})$). In the present embodiment, this area ratio is regarded as the void ratio based on volume. For example, if the area ratio is 20 area %, the void ratio is regarded as 20 vol %. If the noble metal-containing layer 22 has a void ratio within the above range, substances can migrate sufficiently without lowering the efficiency for utilizing the noble metal.

It is preferred that the stacked two or more noble metal-containing layers 22 be partly unified to constitute a metal part. That is thought to be because protons or hydrogen atoms are smoothly transferred to the electrode reaction although the mechanism is not fully clear.

(Porous Ceramic Layer)

As described above, the porous ceramic layer 23 includes pores and is placed between adjacent two of the noble metal-containing layers 22. The porous ceramic layer 23 has a void ratio of preferably 20 to 80 vol % inclusive, more preferably 30 to 80 vol % inclusive. If the void ratio is less than 20 vol %, the porous ceramic layer works on water management so insufficiently that the electrochemical cell often shows unstable characteristics at high current density. On the other hand, if the void ratio is more than 80 vol %, the electrochemical cell may have insufficient endurance and it is feared that the porous ceramic layer may have poor structure stability. The void ratio in the porous ceramic layer is determined in the following manner. First, the cross-section is observed by SEM to obtain a void area ($S_{C1}$) and a ceramic area ($S_{C2}$) in the porous ceramic layer. Then, the void area ($S_{C1}$) is divided by the total area ($S_{C1}+S_{C2}$) to obtain the area ratio ($S_{C1}/(S_{C1}+S_{C2})$).

In the present embodiment, this area ratio is regarded as the void ratio based on volume. For example, if the area ratio is 20 area %, the void ratio is regarded as 20 vol %.

According to operating environment of the electrochemical cell, plural porous ceramic layers may be sandwiched between the noble metal-containing layers. In that case, in view of the endurance and stability, the distance between the adjacent two porous ceramic layers is preferably 5 to 200 nm inclusive.

There are no particular restrictions on the material composition and structure of the porous ceramic layer 23 as long as the electrochemical cell has sufficient chemical and electrochemical stability in the operating environment. For example, the porous ceramic layer 23 can be made with oxides containing any of Ru, Ta, Sn, Zr, W and Nb.

From the viewpoints of reducing water stagnation and of improving water-holding capacity in the voids, the porous ceramic layer 23 has a thickness of preferably 5 to 100 nm inclusive, more preferably 10 to 80 nm inclusive.

It is enough that at least voids 24 exist between the noble metal-containing layers 22 and the porous ceramic layers 23. In addition to the voids 24, other materials such as fibrous carbons may be placed between them.

The voids preferably occupy the spaces between the noble metal-containing layers 22 and the porous ceramic layers 23 in a volume ratio of 30 vol % or more.

Since the porous ceramic layer 23 is placed between two of the noble metal-containing layers 22 in the present embodiment, it is possible to realize excellent cell voltage, favorable robustness and high endurance. Specifically, when water is produced on the cathode side by PEFC power generation and then soaks into the voids 24, the porous ceramic layer 23 can absorb the water because it is hydrophilic and includes voids. Consequently, even if water is produced, the fuel gas is not prevented from diffusion. Accordingly, it is possible to avoid depression of the cell voltage even under humid conditions. Further, also under dry conditions, the porous ceramic layer 23 can release retained moisture to reduce dryness of the electrolytic membrane. The porous ceramic layer 23 thus enables to ensure high cell voltage and excellent robustness. In addition, if the catalyst layer contains no carrier, there is no fear that the carrier may be corroded. It is hence possible to obtain excellent endurance.

<<<Process for Producing Catalyst Layer and Membrane Electrode Assembly>>>

The above catalyst layer can be produced by a process comprising the steps of:

forming a noble metal-containing layer (S01), forming a pore-forming material layer on said noble metal-containing layer (S02), forming a pore-forming material-containing ceramic layer on said pore-forming material layer (S03), repeating twice or more the above steps in order, to obtain a starting laminate (S04), and removing said pore-forming material layers and said pore-forming material contained in said pore-forming material-containing ceramic layers from said starting laminate (S05). The noble metal-containing layer may be finally formed after the steps are repeated.

Specifically, first as shown in FIG. 4A, a starting laminate 27 is produced by repeating twice or more in order the steps of forming a noble metal-containing layer 22 on a substrate 21, of forming a pore-forming material layer 25 on the noble metal-containing layer 22, and of forming a pore-forming material-containing ceramic layer 26 on the pore-forming material layer 25. The starting laminate 27 thus formed comprises the substrate 21, the noble metal-containing layers 22 provided thereon, the pore-forming material layers 25 and the pore-forming material-containing ceramic layers 26.

The noble metal-containing layer may contain a pore-forming material. In fact, there are cases in which the noble metal-containing layer needs to contain a pore-forming material so as to achieve a high void ratio.

The noble metal-containing layers 22, the pore-forming material layers 25 and the pore-forming material-containing ceramic layers 26 can be individually formed by sputtering or vapor-deposition method.

The pore-forming material is required to be more soluble than the catalyst material (noble metal) in the cleaning solution described below. The pore-forming material is, for example, a metal or metal oxide. As the pore-forming material, metals are preferably used because they can be formed into a film, can be removed in short time, are excellent in treatability and are inexpensive. Examples of them include Mn, Fe, Co, Ni, Zn, Sn, Al and Cu. In addition, particles of ceramics such as oxides and nitrides can be used as the pore-forming material. Further, two or more kinds of pore-forming materials may be employed to form a proper void structure.

When the pore-forming material is sputtered or vapor-deposited, oxygen may be introduced to the atmosphere so as to control the stability and structure of the porous ceramic layer and the oxides. The oxygen partial pressure in the atmosphere is preferably less than 20%.

The pore-forming material constituting the pore-forming material layer 25 and that 26*a* contained in the pore-forming material-containing ceramic layer 26 can be washed away with a cleaning solution, and hence the pore-forming material layer 25 and that 26*a* contained in the pore-forming material-containing ceramic layer 26 can be removed from the starting laminate 27 by washing with the cleaning solution. As the cleaning solution, an acidic or alkaline solution is employed.

The pore-forming material layers 25 and that 26*a* contained in the pore-forming material-containing ceramic layers 26 are selectively removed from the starting laminate 27, to form porous ceramic layers 23 and voids 24 between the porous ceramic layers 23 and the noble metal-containing layers 22, as shown in FIG. 4B. If the noble metal-containing layers contain the pore-forming material same as the pore-forming material layers 25, voids are also formed in the noble metal-containing layers when the pore-forming material layers 25 are removed.

The catalyst layer 15 is thus obtained in which the voids 24 are placed between the porous ceramic layers 23 and the two or more noble metal-containing layers 22. The porous ceramic layers 23 and the plural noble metal-containing layers 22 are fused at their edges, for example, by self-assembly to connect physically with each other (not shown).

If needed, the pore-forming material can be removed by electrolysis or by a combination of electrolysis and washing. Further, heat treatment may be carried out before and/or after the material is removed. However, even by those procedures, the pore-forming material (pore-forming metal) sometimes cannot be removed completely from the starting laminate 27. In consideration of that, the pore-forming material may be incorporated in the starting laminate 27 in an amount more than the aimed void ratio.

When the pore-forming metal is dissolved, the catalyst material may be eluted into the cleaning solution. However, that can be avoided by beforehand fixing the starting laminate 27 on the substrate. Specifically, the starting laminate 27 is soaked with a polymer solution such as Nafion ([trademark], manufactured by DuPont), and then dried. Thereafter, the pore-forming metal is dissolved. According to necessity, the cleaning solution may be purged of dissolved oxygen.

The pore-forming material may partially remain in the catalyst layer 15. The remaining pore-forming material is thought to form a stable oxide and thereby to contribute toward growth suppression of the catalyst material, retention of the catalyst layer structure, promotion of the proton conductivity and the like.

The formed catalyst layer 15 may be soaked with a polymer solution such as Nafion ([trademark], manufactured by DuPont) by spraying or immersing, so as to improve the proton conductivity.

In addition, that can improve adhesion between the catalyst layer 15 and other members. For controlling water repellency, the catalyst layer 15 can contain a water-repellent agent. Examples of the water-repellent agent include polytetrafluoroethylene (PTFE), polyvinylidene fluoride (PVDF), polyhexafluoropropylene, and tetrafluoroethylene-hexafluoropropylene copolymer (FEP) and hydrophobized silica.

The catalyst layer can be also produced by a process comprising the steps of:

forming a noble metal-containing layer (S11), forming a pore-forming material layer on said noble metal-containing layer (S12), forming a porous ceramic layer on said pore-forming material layer (S13), repeating twice or more the above steps in order, to obtain a starting laminate (S14), and removing said pore-forming material layers from said starting laminate (S15). The noble metal-containing layer may be finally formed after the steps are repeated.

Specifically, first, a starting laminate is produced by repeating twice or more in order the steps of forming a noble metal-containing layer 22 on a substrate, of forming a pore-forming material layer on the noble metal-containing layer 22, and of forming a porous ceramic layer 23 on the pore-forming material layers. The starting laminate thus formed comprises the substrate, the noble metal-containing layers 22 provided thereon, the pore-forming material layers and the porous ceramic layers 23. Subsequently, the pore-forming material layers are selectively removed from the starting laminate, to form voids 24 between the porous ceramic layers 23 and the noble metal-containing layers 22. Thus, a catalyst layer 15 is obtained. The pore-forming material layers in the above procedure are the same as those of 25 described above, and hence the explanation thereof is omitted.

The MEA 10 can be made with the catalyst layers 14, 15, for example, in the following manner. As shown in FIG. 1, if the catalyst layers 14, 15 are provided on the gas-diffusion layers 16, 17, respectively, serving as substrates, they are face-to-face placed so that the substrates are positioned outside and the electrolyte membrane 13 is placed between them to form a laminate. The laminate is then bonded together by heating and pressing to obtain the MEA 10.

If provided on substrates for transfer, the catalyst layers 14 and 15 are transferred from the transfer substrates onto the gas-diffusion layers 16 and 17, respectively. Subsequently, the electrolyte membrane 13 is then placed between the catalyst layers, as shown FIG. 1, to form a laminate. The laminate is then bonded together by heating and pressing to obtain the MEA 10. In another way, at least one of the catalyst layers 14 and 15 is transferred onto the electrolyte membrane 13, and thereafter the gas-diffusion layers 16 and 17 are placed on the catalyst layers 14 and 15, respectively. The laminate thus formed as shown FIG. 1 is then bonded together by heating and pressing to obtain the MEA 10.

The above members are individually bonded generally by means of hot-press machine. The press temperature is higher than the glass transition temperature of polymer electrolyte adopted as a binder in the electrodes 11 and 12 and in the electrolyte membrane 13, and is normally 100 to 400° C. The pressing pressure generally depends on the hardness of the electrodes 11 and 12, and is normally 5 to 200 kg/cm$^2$.

In the present embodiment, since the MEA 10 comprises the catalyst layer 14 having a structure shown in FIG. 2, it is possible because of the aforementioned reasons to obtain a high cell voltage, excellent robustness and sufficient endurance.

<<Electrochemical Cell>>

The following is an explanation of the electrochemical cell, which will be described below for use as a single cell in a fuel cell.

FIG. 5 shows a single cell 30 having a structure in which the MEA 10 shown in FIG. 1 is placed between an anode separator 31 and a cathode separator 32.

The anode separator 31 and the cathode separator 32 individually include flow paths 31a, 32a, respectively, so that air and the fuel can be supplied to the MEA 10. Further, there are sealing members 33, 34 on both sides of the catalyst layers 14, 15 and the gas-diffusion layers 16, 17, respectively, so as to prevent leakage of the fuel and/or oxidizing agent from the MEA 10.

A plural number of the single cells 30 are stacked and connected in series to obtain a fuel cell (not shown). If a plural number of the MEAs 10 are employed, it is possible to generate a high electromotive force. There are no particular restrictions on the shape of the fuel cell, and the shape is properly selected according to the desired characteristics, such as the voltage, of the cell. The fuel cell may have a plane arrangement structure as well as a stacked structure. There are also no particular restrictions on the number of the single cells included in the fuel cell.

As the fuel, it is possible to adopt an aqueous solution containing at least one selected from the group consisting of hydrogen, reformed gas, methanol, ethanol and formic acid.

The electrochemical cell of the present embodiment may be an electrolysis cell or a MEMS (microelectromechanical system)-type electrochemical cell. The electrolysis cell, for example, can have the same constitution as the above fuel cell except that the anode is replaced with an oxygen-generating catalyst electrode as the electrode 11.

In the present embodiment, since the single cell 30 comprises the catalyst layer 14 having a structure shown in FIG. 2, it is possible because of the aforementioned reasons to obtain a high cell voltage, excellent robustness and sufficient endurance.

Second Embodiment

Figure 6:
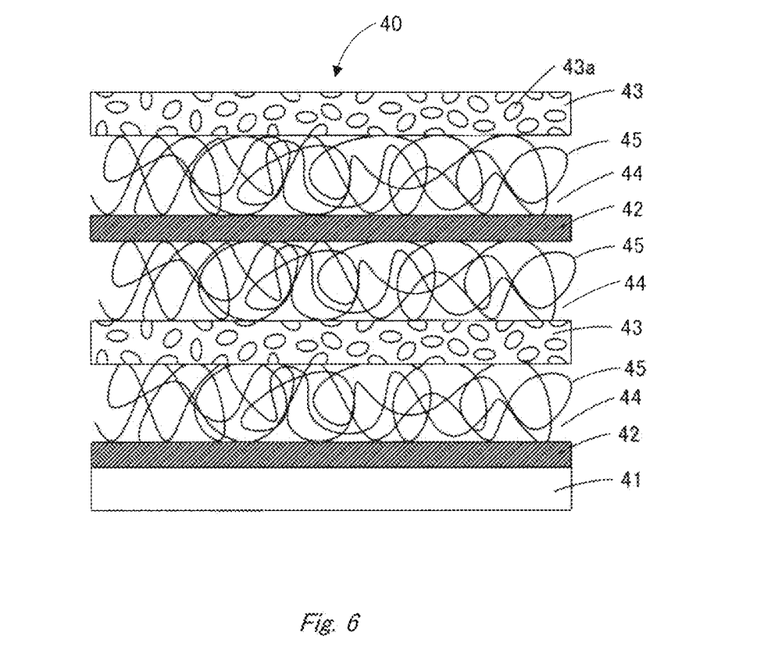
FIG. 6 is a schematic sectional view of a catalyst layer according to the second embodiment.
Figure 7A:
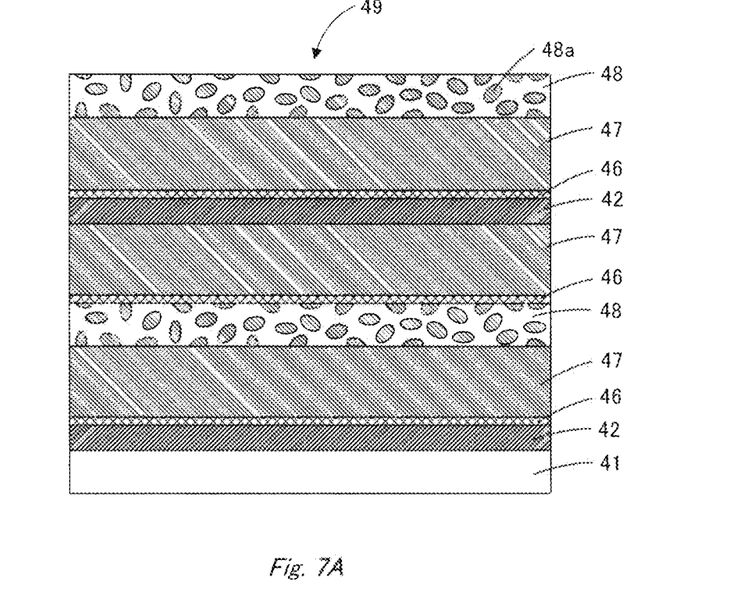
FIGS. 7A and 7B schematically illustrate a process for producing a catalyst layer according to the second embodiment.
Figure 7B:
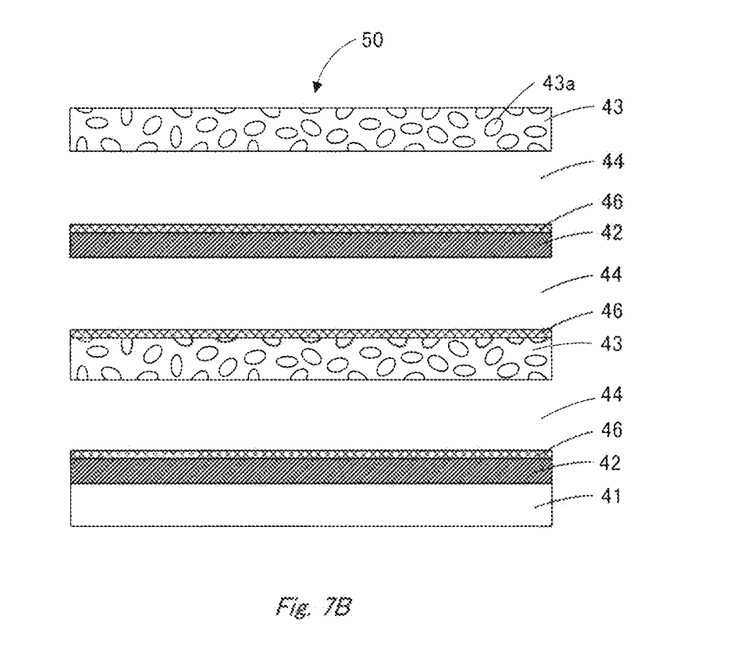
Figure 8A:
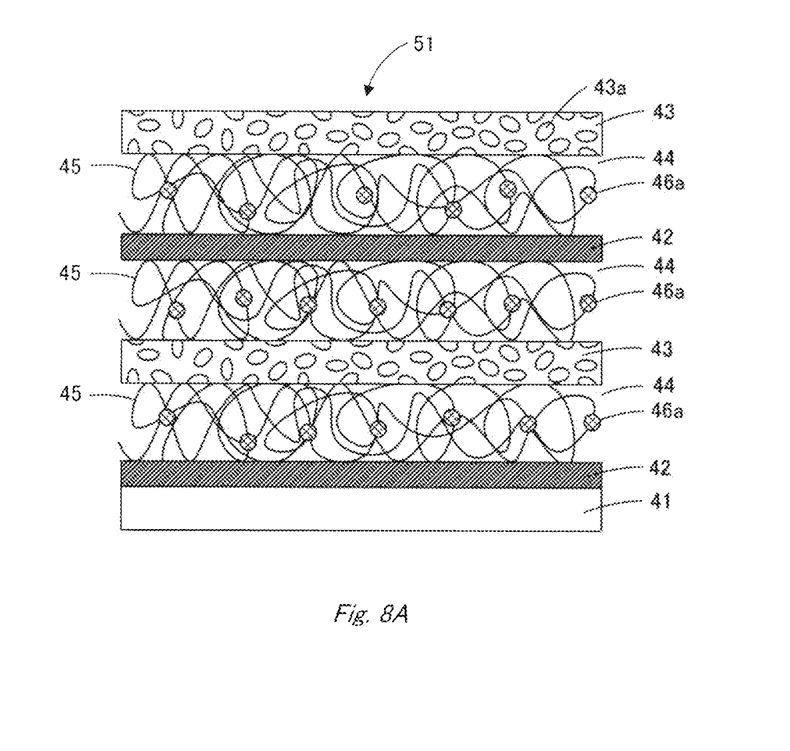
FIGS. 8A and 8B schematically illustrate a process for producing a catalyst layer according to the second embodiment.
Figure 8B:
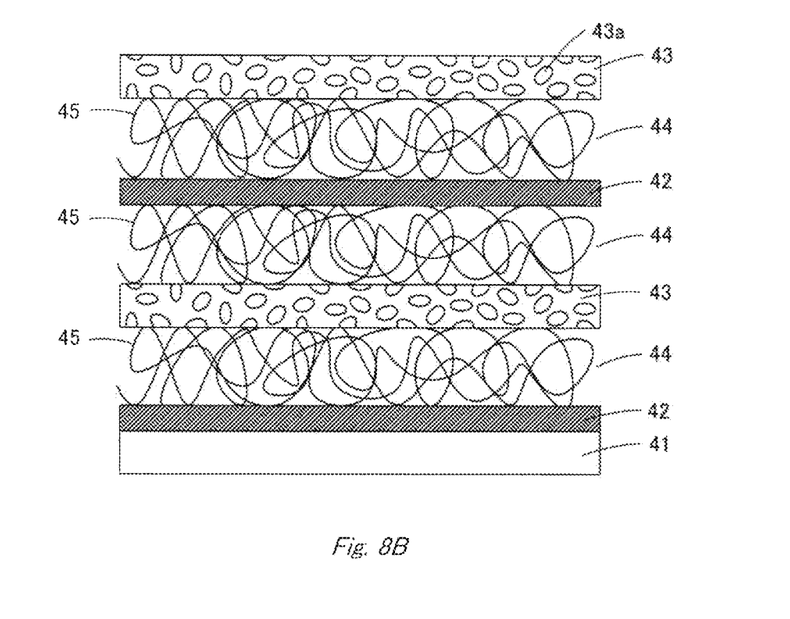

According to the second embodiment, a catalyst layer and a process for producing the layer are described below with reference to the attached drawings. FIG. 6 is a schematic sectional view of a catalyst layer according to the present embodiment, and FIGS. 7 and 8 schematically illustrate a process for producing a catalyst layer according to the present embodiment.

<<<Catalyst Layer>>>

Although the first embodiment adopts the catalyst layer 15 having the structure of FIG. 2, the present embodiment adopts a catalyst layer 40 having the structure of FIG. 6 in place of the catalyst layer 15. However, similarly to the first embodiment, the catalyst layer 40 is incorporated to work in the MEA 10 or in the single cell 30.

As shown in FIG. 6, the catalyst layer 40 in the present embodiment comprises a substrate 41, two or more noble metal-containing layers 42 stacked on the substrate 41, and porous ceramic layers 43 which are placed between the noble metal-containing layers 42 and which contain voids 43a. In addition, voids 44 and fibrous carbons 45 placed between the noble metal-containing layers 42 and the porous ceramic layers 43. The voids 44 also exist among the fibrous carbons 45. The substrate 41, noble metal-containing layers 42, porous ceramic layers 43 and voids 44 are the same as those of 21, 22, 23 and 24, respectively, described above, and hence the explanations thereof are omitted.

The fibrous carbons 45 preferably have diameters of 2 to 500 nm inclusive from the viewpoint of ensuring the voids.

Since the present embodiment comprises the catalyst layer 40 having a structure shown in FIG. 6, it is possible because of the same reasons as described above to obtain a high cell voltage, excellent robustness and sufficient endurance. In addition, since not only the voids 44 but also the fibrous carbons 45 are placed between the noble metal-containing layers 42 and the porous ceramic layers 43, the catalyst layer 40 is protected from crash damage to keep the shape. Accordingly, the endurance is further improved.

<<<Process for Producing Catalyst Layer>>>

The above catalyst layer can be produced by a process comprising the steps of:
forming a noble metal-containing layer (S21),
forming a carbon-synthesizing catalyst layer on said noble metal-containing layer (S22),
forming a pore-forming material layer on said carbon-synthesizing catalyst layer (S23), forming a pore-forming material-containing ceramic layer on said pore-forming material layer (S24), forming a carbon-synthesizing catalyst layer on said pore-forming material-containing ceramic layer (S25), forming a pore-forming material layer on said carbon-synthesizing catalyst layer (S26), repeating twice or more the above steps in order, to obtain a starting laminate (S27), removing said pore-forming material layers and said pore-forming material contained in said pore-forming material-containing ceramic layers from said starting laminate (S28), forming fibrous carbons on the carbon-synthesizing catalyst layers by use of carbon-containing gas introduced into voids formed by removing the pore-forming material layers (S29), and removing the carbon-synthesizing catalyst after the fibrous carbons are formed (S30). The noble metal-containing layer may be finally formed after the steps are repeated.

Specifically, first as shown in FIG. 7A, a starting laminate 49 is produced by repeating twice or more in order the steps of forming a noble metal-containing layer 42 on a substrate 41, of forming a carbon-synthesizing catalyst layer 46 on the noble metal-containing layer 42, of forming a pore-forming material layer 47 on the carbon-synthesizing catalyst layer 46, of forming a pore-forming material 48a-containing ceramic layer 48 on the pore-forming material layer 47, of forming a carbon-synthesizing catalyst layer 46 on the pore-forming material-containing ceramic layer 48, and of forming a pore-forming material layer 47 on the carbon-synthesizing catalyst layer 46. The starting laminate 49 thus formed comprises the substrate 41, the noble metal-containing layers 42 provided thereon, the carbon-synthesizing catalyst layers 46, the pore-forming material layers 47, the pore-forming material-containing ceramic layers 48.

The pore-forming material layers 47 and the pore-forming material 48a are the same as those of 25 and 26a, respectively, described above, and hence the explanations thereof are omitted. The carbon-synthesizing catalyst layer 46 is made with a carbon-synthesizing catalyst, which is not particularly restricted. As the carbon-synthesizing catalyst, a metal (A) selected from Ni, Co or Fe can be adopted. The metal (A) may be an alloy with a metal (B) selected from Al or Cu. Further, common synthesizing catalysts, such as mixtures of the metal (A) with other substances, can be employed as the carbon-synthesizing catalyst. The carbon-synthesizing catalyst is preferably a Ni- or Co-type synthesizing catalyst capable of lowering the temperature for synthesizing the fibrous carbons so as to avoid such a high temperature treatment of the noble metal-containing layers 42 that the catalyst layer may undergo structure collapsing.

As described below, the pore-forming material layers 47 and the pore-forming material 48a are removed but the carbon-synthesizing catalyst layers 46 must be left. It is therefore necessary that the metal used for the pore-forming material be different from that for the carbon-synthesizing catalyst. For example, if the carbon-synthesizing catalyst is made with Ni, metals other than Ni, such as Al, must be employed for the pore-forming material.

Subsequently, the pore-forming material layers 47 and the pore-forming material 48a contained in the pore-forming material-containing ceramic layers 48 are selectively removed from the starting laminate 49, to form porous ceramic layers 43 and voids 44 between the carbon-synthesizing catalyst layers 46 and the porous ceramic layers 43 and between the noble metal-containing layers 42 and the carbon-synthesizing catalyst layers 46, as shown in FIG. 7B. If the noble metal-containing layers contain the same pore-forming material as the pore-forming material layers 47, voids are also formed in the noble metal-containing layers when the pore-forming material layers 47 are removed.

In the present embodiment, it is necessary for the carbon-synthesizing catalyst layers 46 to remain in the step of selectively removing the pore-forming material from the starting laminate 49. Accordingly, the removing step needs to be carefully carried out. For example, the cleaning solution must be selected in consideration of that. If Al is adopted as the pore-forming material and Ni is employed as the catalyst for synthesizing fibrous nano-carbons, an alkali solution can be used as the cleaning solution.

As a result of removing the pore-forming material layers 47 and the pore-forming material 48a contained in the pore-forming material-containing ceramic layers 48, a void-containing laminate 50 is obtained which comprises the noble metal-containing layers 42, the carbon-synthesizing catalyst layers 46, the voids 44 and the porous ceramic layers 43. The two or more noble metal-containing layers 42, the carbon-synthesizing catalyst layers 46 and the porous ceramic layers 43 are fused at their edges, for example, by self-assembly to connect physically with each other (not shown). In this step, however, the pore-forming material is often insufficiently removed.

If needed, the removal of the pore-forming material can be carried out by electrolysis or by a combination of electrolysis and washing. Further, heat treatment may be carried out before and/or after the removal. However, even by those procedures, the pore-forming material (pore-forming metal) sometimes cannot be removed completely from the starting laminate 49. In view of that, the pore-forming material may be incorporated in the starting laminate 49 in an amount more than the aimed void ratio.

The catalyst material may be eluted in the cleaning solution when the pore-forming metal is dissolved, but that can be avoided by beforehand fixing the starting laminate 49 on the substrate. Specifically, the starting laminate 49 is soaked with a polymer solution such as Nafion ([trademark], manufactured by DuPont), and then dried. Thereafter, the pore-forming metal is dissolved. According to necessity, the cleaning solution may be purged of dissolved oxygen.

After the above procedure, the fibrous carbons 45 are formed in the voids 44 by a thermal CVD method, in which, for example, a carbon-containing gas such as $C_2H_4$ is made to flow in the voids 44 and at the same time the void-containing laminate 50 is heated at 300 to 700° C. As a result of this procedure, the fibrous carbons 45 shown in FIG. 8A are formed in the voids 44 to obtain a fiber-containing laminate 51. In the fiber-containing laminate 51, the carbon-synthesizing catalyst layers 46 are no longer in the form of layers but are changed into granular carbon-synthesizing catalyst 46a.

After the fibrous carbons 45 are thus formed, the carbon-synthesizing catalyst 46a and the remaining pore-forming material are removed. In this way, the voids 44 and the fibrous carbons 45 are formed to obtain a catalyst layer shown in FIG. 8B. The carbon-synthesizing catalyst 46a can be removed by washing with an acidic solution. Examples of the acidic solution include nitric acid, hydrochloric acid, sulfuric acid, and mixtures thereof. The above fiber-containing laminate 51 is immersed in the acidic solution for 5 minutes to 50 hours, to remove the carbon-synthesizing catalyst 46a. During this procedure, the acidic solution may be heated at about 50 to 100° C.

Even after the washing, the carbon-synthesizing catalyst 46a often still remains in the catalyst layer. However, the remaining carbon-synthesizing catalyst 46a is thought to be an oxide working on absorbing water and thereby to contribute toward improving the characteristics. The carbon-synthesizing catalyst 46a preferably contains Ni, Co and Fe in an amount of 0.5 to 50 atm % inclusive based on the total metal content. There are cases in which other materials such as Cu may be incorporated as a promoter in the carbon-synthesizing catalyst so as to control the shape and amount of the fibrous carbons.

The formed catalyst layer 40 may be soaked with a polymer solution such as Nafion ([trademark], manufactured by DuPont) by spraying or immersing. The catalyst layer 40 can be thus improved in the proton conductivity or water absorbability to enhance the PEFC power generation characteristics.

In addition, that can improve adhesion between the catalyst layer 40 and other members. For controlling water repellency, the catalyst layer 40 can contain a water-repellent agent. Examples of the water-repellent agent include polytetrafluoroethylene (PTFE), polyvinylidene fluoride (PVDF), polyhexafluoropropylene, and tetrafluoroethylene-hexafluoropropylene copolymer (FEP) and hydrophobized silica.

EXAMPLES

For the purpose of explaining the embodiments in detail, examples are described below but they by no means restrict the embodiments.

Examples 1 to 4

First, a sheet of carbon paper (Toray 060 [trademark], manufactured by Toray Industries Inc.) was prepared as a substrate. The carbon paper was provided with a carbon layer of 1 to 50 µm thickness on the surface. The substrate was then subjected to sputtering to form a noble metal-containing ceramic layer. Further, on the noble metal-containing layer, a pore-forming material layer, a pore-forming material-containing ceramic layer and another pore-forming material layer were successively formed in order by sputtering. Those layers were again successively formed one by one so that the catalyst loading amount might be 0.1 mg/cm$^2$, to obtain a starting laminate.

Here, the "catalyst loading amount" means an amount of the catalyst (noble metal) per square centimeter of the electrode area. The obtained starting laminate was then subjected to acid treatment by immersing the laminate in a 0.5 M sulfuric acid aqueous solution at 60 to 100° C. for 12 hours, to remove the pore-forming material in the pore-forming material-containing ceramic layers and the pore-forming material layers from the laminate. After that acid treatment was repeated twice, the laminate was washed with pure water. Finally, the resultant laminate was dried at 60 to 100° C. to obtain a catalyst layer according to each of Examples 1 to 4. Table 1 shows the compositions, thicknesses, void ratios and the like of the noble metal-containing layer, the pore-forming material layer, and the porous ceramic layer.

Examples 5 to 8

First, a sheet of carbon paper (Toray 060 [trademark], manufactured by Toray Industries Inc.) was prepared as a substrate. The carbon paper was provided with a carbon layer of 1 to 50 µm thickness on the surface. The substrate was then subjected to sputtering to form a noble metal-containing ceramic layer. Further, on the noble metal-containing layer, a carbon-synthesizing catalyst layer, a pore-forming material layer, a pore-forming material-containing ceramic layer and another pore-forming material layer were successively formed in order by sputtering. Those layers were again successively formed one by one so that the catalyst loading amount might be 0.1 mg/cm$^2$, to obtain a starting laminate. The obtained starting laminate was subjected to alkali treatment by immersing the laminate in a NaOH aqueous solution (pH: 10 to 14) at 60 to 100° C. for 30 minutes, to remove the pore-forming material contained in the pore-forming material-containing ceramic layers and the pore-forming material layers from the laminate. After that alkali treatment was repeated twice, the laminate was washed with pure water and then dried to obtain a void-containing laminate.

Subsequently, fibrous carbons were formed on the carbon-synthesizing catalyst layers by a thermal CVD method in which $C_2H_4$ gas was made to flow and at the same time the void-containing laminate was heated at 300 to 500° C., to produce a fiber-containing laminate including the fibrous carbons.

The fiber-containing laminate was then subjected to acid treatment by immersing the laminate in a 0.5 M sulfuric acid aqueous solution at 60 to 100° C. for 30 minutes. After that acid treatment was repeated twice, the laminate was washed with pure water. Finally, the resultant laminate was dried to obtain a catalyst layer. Table 1 shows the compositions, thicknesses, void ratios and the like of the noble metal-containing layer, the carbon-synthesizing catalyst layer, the pore-forming material layer and the porous ceramic layer.

Comparative Example 1

The procedure of Example 1 was repeated except that the porous ceramic layers were not formed, to produce a catalyst layer. Table 1 shows the composition and the like of the noble metal-containing layers.

Comparative Example 2

Commercially available granular Pt catalyst (TEC 10E50E-HT [trademark], manufactured by Tanaka Kikinzoku Kogyo K.K.), pure water, a 20% solution of Nafion ([trademark], manufactured by DuPont) and 2-ethoxyethanol were mixed in amounts of 2 g, 5 g, 5 g and 20 g, respectively. The obtained mixture was sufficiently stirred and dispersed to produce slurry. Thereafter, a sheet of carbon paper (350 µm, manufactured by Toray Industries Inc.) beforehand subjected to water-repellent treatment was prepared, coated with the above slurry by means of a control coater, and then dried to obtain a Pt catalyst layer (standard electrode) in which the loading density of the Pt catalyst was 0.1 mg/cm$^2$.

TABLE 1

| | Noble metal-containing layer | | | Pore-forming material layer | | Carbon-synthesizing catalyst layer | | Porous ceramic layer | | | Maximum distance between the layers (nm) |
|---|---|---|---|---|---|---|---|---|---|---|---|
| | Composition | Thickness (nm) | Void ratio (vol %) | Composition | Thickness (nm) | Composition | Thickness (nm) | Composition | Thickness (nm) | Void ratio (vol %) | |
| Ex. 1 | Pt | 3.5 | 0 | Ni | 50 | — | — | $RuO_2$ | 10 | 0 | 40 |
| Ex. 2 | PtCo | 8.0 | 40 | Ni | 50 | — | — | NiRuO | 20 | 20 | 50 |
| Ex. 3 | PtNi | 10.0 | 30 | Ni | 50 | — | — | NiTaO | 20 | 40 | 60 |
| Ex. 4 | PtSn | 20.0 | 50 | Ni | 50 | — | — | $NiSiO_2$ | 20 | 60 | 70 |
| Ex. 5 | PtCo | 7.0 | 40 | Al | 50 | NiAl | 5 | $RuO_2$ | 15 | 20 | 50 |
| Ex. 6 | PtW | 5.0 | 30 | Al | 80 | NiAl | 5 | $SnO_2$ | 5 | 60 | 80 |
| Ex. 7 | PtNi | 6.0 | 40 | Zn | 100 | NiZn | 5 | WNbO | 50 | 60 | 100 |
| Ex. 8 | PtNi | 5.5 | 40 | SnAl | 100 | NiCoAl | 5 | ZrTaO | 100 | 80 | 200 |
| Com. 1 | Pt | 3.5 | 0 | Ni | 50 | — | — | — | — | — | 100 |
| Com. 2 | Pt/C | 4000 | — | — | — | — | — | — | — | — | — |

The catalyst layer obtained in each of Examples 1 to 8 and Comparative examples 1 and 2 was used as a cathode while the Pt catalyst layer obtained in Comparative example 2 was adopted as a anode, to produce a MEA. The produced MEAs were individually evaluated. Specifically, each catalyst layer produced in Examples 1 to 8 and Comparative examples 1 and 2 was cut into a square of 7.07 cm×7.07 cm, and then used as a cathode. Accordingly, each cathode had an area of about 50 cm².

In the space between the cathode and the anode, Nafion 211 ([trademark], manufactured by DuPont) was placed. The formed layered stack was then bonded by heating at 125° C. under a pressure of 15 kg/cm², to obtain a MEA. Independently, the aforementioned standard electrode was used as both a cathode and an anode to produce a standard MEA for comparison.

<Production of Single Cell for Fuel Cell>

The obtained MEA was sandwiched between an anode separator and a cathode separator, to produce a single cell for a polymer electrode fuel cell. The anode separator and the cathode separator were individually provided with flow paths.

The produced catalyst layers, MEAs and single cells were evaluated in terms of the following aspects.

<Measurement of Void Ratio and Maximum Distance Between the Layers>

Each catalyst layer obtained in Examples 1 to 8 and Comparative example 1 was cut. For example, if having a rectangular shape, the catalyst layer was cut parallel to the longitudinal edge at the center of the lateral edge. The catalyst layer of Comparative example 2 was also cut in the same manner. The sectional face of each catalyst layer was then observed by SEM at the center of the section.

As a result, each catalyst layer obtained in Examples 1 to 4 was verified to have a multilayer structure comprising plural noble metal-containing layers, porous ceramic layers between the noble metal-containing layers, and voids between the ceramic layers and the noble metal-containing layers. Further, each catalyst layer obtained in Examples 5 to 8 was verified to have a multilayer structure comprising plural noble metal-containing layers, porous ceramic layers between the noble metal-containing layers, and voids and fibrous carbons between the ceramic layers and the noble metal-containing layers. On the other hand, the catalyst layer of Comparative example 1 was verified to have a multilayer structure in which plural noble metal-containing layers are stacked but separated by voids. The catalyst layer of Comparative example 2 was also verified to have a monolayer structure provided with pores.

Further, each catalyst layer was cut along the thickness direction in the upper, middle and lower parts, and then the sectional face in each part were observed at three positions by SEM. Nine SEM images in total at 400,000 to 800,000-fold magnification were thus obtained. On the basis of contrast of the images, the noble metal area in the noble metal-containing layer and the ceramic and void areas in the porous ceramic layer were recognized. In each image, the area ($S_{N1}$) occupied by the voids and that ($S_{N2}$) occupied by the noble metal in the noble metal-containing layer were measured. The void area ($S_{N1}$) was divided by the total area ($S_{N1}$–$S_{N2}$) to obtain the area ratio ($S_{N1}/(S_{N1}$–$S_{N2}$)), and the area ratio was regarded as the volume ratio. With respect to each image, the volume ratio was thus calculated. The volume ratios obtained from the nine images were averaged to estimate the void ratio of the noble metal-containing layer. Similarly, from the images of the porous ceramic layer, the area ($S_{C1}$) occupied by the voids and that ($S_{C2}$) occupied by the ceramics were measured. The void area ($S_{C1}$) was divided by the total area ($S_{C1}+S_{C2}$) to obtain the area ratio ($S_{C1}/(S_{C1}+S_{C2}$)), and the area ratio was regarded as the volume ratio. With respect to each image, the volume ratio was thus calculated. The volume ratios obtained from the nine images were averaged to estimate the void ratio of the porous ceramic layer.

In the thickness direction of the catalyst layer, the distance from each porous ceramic layer to the adjacent noble metal-containing layer was measured to obtain the maximum distance. The maximum distances thus obtained from the nine images were averaged to estimate the maximum distance between the porous ceramic layers and the noble metal-containing layers.

<Cell Voltage Measurement and Evaluation of Robustness>

The obtained single cell was conditioned for one day. Thereafter, while the cell was kept at 65° C., hydrogen as the fuel and air were supplied to the anode and cathode, respectively. The flow rates of hydrogen and air were 0.5 L/min and 2 L/min, respectively. Both the hydrogen and air had a relative humidity of 60%. While the hydrogen and air were supplied, the cell was discharged in a current density of 1 A/cm² for 10 minutes. After that, the cell voltage ($V_c$) was measured.

In order to evaluate robustness, the above procedure was repeated except that the humidity of both the hydrogen and air was changed into 100%. The robustness was evaluated on the basis of the cell voltage depression ($\Delta V_c$) according to the following criteria. If the robustness is graded "A" or "B", the cell is practically usable.

$\Delta V_c \leq 25$ mV: A
$25 < \Delta V_c \leq 50$ mV: B
$\Delta V_c > 50$ mV: C <Endurance>

According to the following endurance protocol, the endurance of each cell was evaluated. While each single cell was kept at 65° C., hydrogen at a flow rate of 0.2 L/min and nitrogen at a flow rate of 1 L/min were supplied to the anode and cathode, respectively. Both the hydrogen and nitrogen had a relative humidity of 100%. While those conditions were maintained, the cell voltage was kept at 0.6 V for 3 seconds and then at 1.0 V for 3 seconds. That operation as one cycle was repeated 30000 times in total. Thereafter, while the cell was kept at 65° C., hydrogen as the fuel at a flow rate of 0.5 L/min and air at a flow rate of 2 L/min were supplied to the anode and cathode, respectively. Both the hydrogen and air had a relative humidity of 60%. The cell was then discharged in a current density of 1 A/cm² for 10 minutes. After that, the cell voltage ($V_1$) was measured and compared with that ($V_c$) before the operations to obtain a depression ratio ($100 \times (V_c - V_1)/V_c$). According to the depression ratio, the endurance was graded as follows. If the endurance is graded "AA" or "A", the cell is practically usable.

5% or less: AA
more than 5% but not more than 10%: A
more than 10% but not greater than 20%: B
more than 20%: C The results are shown in Table 2.

TABLE 2

|  | Cell voltage (V) | Robustness | Endurance |
|---|---|---|---|
| Ex. 1 | 0.69 | A | A |
| Ex. 2 | 0.68 | A | A |
| Ex. 3 | 0.69 | A | A |
| Ex. 4 | 0.68 | A | A |
| Ex. 5 | 0.71 | A | A |
| Ex. 6 | 0.70 | A | AA |
| Ex. 7 | 0.71 | A | AA |
| Ex. 8 | 0.71 | A | AA |
| Com. 1 | 0.67 | C | A |
| Com. 2 | 0.60 | A | C |

The catalyst layer according to Comparative example 1 did not comprise a porous ceramic layer, and hence showed large humidity dependence and poor robustness. The catalyst layer of Comparative example 2, which did not comprise a porous ceramic layer, showed a low cell voltage and had poor endurance. In contrast, when used in a single cell of a fuel cell, the catalyst layer according to each of Examples 1 to 8 is understood to show a high cell voltage and also to be excellent in both robustness and endurance. Further, the catalyst layers of Examples 5 to 8 were found to be superior in endurance to those of Examples 1 to 4. That is presumed to be because the catalyst layers of Examples 5 to 8 contained fibrous carbons.

As described above, the catalyst layer, membrane electrode assembly or electrochemical cell according to one of the present embodiments can realize a high cell voltage, excellent robustness and sufficient endurance. Also according to one of the present embodiments, the method for producing the catalyst layer can provide a catalyst layer which realizes a high cell voltage and which is excellent in both robustness and endurance.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the invention.

The invention claimed is:

1. A catalyst layer, comprising:
two or more noble metal-containing layers which consist of a metal or metal alloy; and
a porous ceramic layer placed between said noble metal-containing layers,
wherein
void layers exist between said porous ceramic layer and said noble metal-containing layers, wherein said noble metal-containing layer and said porous ceramic layer have a fused portion of said noble metal-containing layer and said porous ceramic layer at an edge thereof, the fused portion connecting said noble metal-containing layer and said porous ceramic layer physically such that main surfaces of said noble metal-containing layer and said porous ceramic layer are kept separate via the void layer, and
said porous ceramic layer has a composition different from a composition of said noble metal-containing layer, and consists of:
an oxide or mixed oxide of at least one element of Ta, Sn, Zr, W and Nb;
optionally at least one metal selected from the group consisting of Mn, Fe, Co, Ni, Zn, Sn, Al, and Cu;
optionally an oxide of at least one metal selected from the group consisting of Mn, Fe, Co, Ni, Zn, Al, and Cu; and
optionally a nitride of at least one metal selected from the group consisting of Mn, Fe, Co, Ni, Zn, Sn, Al, and Cu.

2. The catalyst layer according to claim 1, further comprising fibrous carbons placed between said porous ceramic layer and said noble metal-containing layers.

3. The catalyst layer according to claim 1, wherein the maximum distance from said porous ceramic layer to said noble metal-containing layers is 10 nm to 300 nm inclusive.

4. The catalyst layer according to claim 1, wherein said noble metal-containing layers contain voids therein and the void contents thereof are 20 to 80 vol % inclusive.

5. The catalyst layer according to claim 1, wherein said porous ceramic layer contains voids therein and the void content thereof is 20 to 80 vol % inclusive.

6. The catalyst layer according to claim 1, wherein said porous ceramic layer has a thickness of 5 to 100 nm inclusive.

7. The catalyst layer according to claim 1, wherein said noble metal-containing layers contain Pt.

8. The catalyst layer according to claim 1, wherein said noble metal-containing layers contain an alloy represented by $Pt_y Ru_z T_{1-y-z}$, wherein $0.2 \leq y \leq 0.8$, $0 \leq z \leq 0.8$, and T represents at least one element selected from the group consisting of W, Hf, Si, Mo, Ta, Ti, Zr, Ni, Co, Nb, V, Sn, Al and Cr.

9. The catalyst layer according to claim 1, wherein said noble metal-containing layers contain an alloy represented by $Pt_u M_{1-u}$, wherein $0 < u \leq 0.9$ and M represents at least one element selected from the group consisting of Co, Ni, Fe, Mn, Ta, W, Hf, Si, Mo, Ti, Zr, Nb, V, Cr, Al and Sn.

10. The catalyst layer according to claim 1, wherein the maximum distance between adjacent two of said noble metal-containing layers is 10 to 400 nm inclusive.

11. The catalyst layer according to claim 1, wherein the oxide or mixed oxide of at least one element of Ta, Sn, Zr, W and Nb included in said porous ceramic layer is selected from the group consisting of NiTaO, WNbO and ZrTaO.

12. The catalyst layer according to claim 1, wherein said porous ceramic layer contains voids therein and the void content thereof is 30 to 80 vol % inclusive.

* * * * *